United States Patent
Zhou

(10) Patent No.: US 10,764,873 B2
(45) Date of Patent: Sep. 1, 2020

(54) METHOD AND DEVICE FOR CHANNEL SELECTION

(71) Applicant: BAICELLS TECHNOLOGIES CO. LTD., Beijing (CN)

(72) Inventor: Mingyu Zhou, Beijing (CN)

(73) Assignee: BAICELLS TECHNOLOGIES CO. LTD., Beijing (CN)

( * ) Notice: Subject to any disclaimer, the term of this patent is extended or adjusted under 35 U.S.C. 154(b) by 92 days.

(21) Appl. No.: 16/054,765

(22) Filed: Aug. 3, 2018

(65) Prior Publication Data
US 2018/0343650 A1    Nov. 29, 2018

Related U.S. Application Data

(63) Continuation of application No. PCT/CN2017/071373, filed on Jan. 17, 2017.

(30) Foreign Application Priority Data

Feb. 5, 2016 (CN) .......................... 2016 1 0082983

(51) Int. Cl.
*H04W 72/04* (2009.01)
*H04L 5/00* (2006.01)
(Continued)

(52) U.S. Cl.
CPC ....... *H04W 72/0413* (2013.01); *H04L 1/1614* (2013.01); *H04L 5/0037* (2013.01);
(Continued)

(58) Field of Classification Search
CPC ... H04L 1/1614; H04L 1/1861; H04L 5/0005; H04L 5/0037; H04L 5/0053;
(Continued)

(56) References Cited

U.S. PATENT DOCUMENTS 8,958,379 B2    2/2015 He et al.
2013/0242890 A1*  9/2013 He .................. H04L 5/0073
370/329
(Continued)

FOREIGN PATENT DOCUMENTS

CN    102215094 A    10/2011
CN    102355325 A    2/2012
(Continued)

OTHER PUBLICATIONS

Huawei, Hisilicon Company., "Remaining details of PUCCH resource determination for MTC UEs," Proceedings of the 3GPP TSG RAN WGI Meeting #83, R1-156445, Nov. 15, 2015, Anaheim, California, 8 pages.
(Continued)

*Primary Examiner* — Khoa Huynh
(74) *Attorney, Agent, or Firm* — McCoy Russell LLP

(57) ABSTRACT

The present disclosure discloses a method and device for channel selection. The method comprises: indicating a time-domain resource position and a frequency-domain resource position of an extended physical uplink control channel region based on a common physical downlink control channel; and instructing a group of user terminals to transmit an extended physical uplink control channel in the extended physical uplink control channel region which has been indicated, wherein different user terminals each transmit the extended physical uplink control channel in different extended physical uplink control channel regions which have been indicated. The present disclosure solves a technical problem of a larger downlink signaling cost resulted from the uplink scheduling authorization when a larger number of users transmit data in the extended physical uplink control.

9 Claims, 2 Drawing Sheets

(51) Int. Cl.
  *H04W 76/27* (2018.01)
  *H04L 1/16* (2006.01)
  *H04W 72/12* (2009.01)

(52) U.S. Cl.
  CPC .......... *H04L 5/0053* (2013.01); *H04L 5/0055* (2013.01); *H04W 72/042* (2013.01); *H04W 72/1268* (2013.01); *H04W 76/27* (2018.02); *H04L 5/0005* (2013.01); *H04W 72/0446* (2013.01); *H04W 72/0453* (2013.01)

(58) Field of Classification Search
  CPC ... H04L 5/0055; H04L 5/0058; H04L 5/0073; H04W 72/0413; H04W 72/042; H04W 72/0446; H04W 72/0453; H04W 72/048; H04W 72/1268; H04W 76/27
  See application file for complete search history.

(56) References Cited

U.S. PATENT DOCUMENTS

2015/0110022 A1* 4/2015 Liu ................. H04L 1/1861
                                                          370/329
2015/0124667 A1  5/2015 Yang et al.

FOREIGN PATENT DOCUMENTS

| CN | 103945539 A | 7/2014 |
| CN | 104113925 A | 10/2014 |
| CN | 104767595 A | 7/2015 |
| CN | 105722229 A | 6/2016 |
| EP | 2830377 A1  | 1/2015 |
| JP | 2015133635 A | 7/2015 |
| JP | 2015523791 A | 8/2015 |
| KR | 20140135983 A | 11/2014 |
| KR | 20150023673 A | 3/2015 |

OTHER PUBLICATIONS

ISA State Intellectual Property Office of the People's Republic of China, International Search Report Issued in Application No. PCT/CN2017/071373, dated Apr. 11, 2017, WIPO, 4 pages.
Japan Patent Office, Office Action Issued in Application No. 2018-522659, dated Feb. 2, 2019, 17 pages.
European Patent Office, Extended European Search Report Issued in Application No. 17746760.2, dated Jul. 1, 2019, Germany, 14 pages.
Korean Intellectual Property Office, Office Action Issued in Application No. 10-2018-7018953, dated Jul. 22, 2019, 9 pages.

* cited by examiner

METHOD AND DEVICE FOR CHANNEL SELECTION

CROSS-REFERENCE TO RELATED APPLICATIONS

The present application is a continuation of International Patent Application No. PCT/CN2017/071373, filed on Jan. 17, 2017. International Patent Application No. PCT/CN2017/071373 claims priority to Chinese Application No. 201610082983.7 filed on Feb. 5, 2016. The entire contents of the above-mentioned applications are hereby incorporated by reference in their entirety for all purposes

TECHNICAL FIELD

The present disclosure relates to the field of communication and, in particular, to a method and device for channel selection.

BACKGROUND

Currently, a mobile communication system means a system for providing a communication service to a user terminal (e.g. a cellphone) by an operator arranging devices such as a wireless access network device (e.g. a base station), a core network device (e.g. a home location register, HLR in short), etc. The mobile communication technique has been through the development of a first generation, a second generation, a third generation and a fourth generation. The first generation of mobile generation applies a cellular telephone standard with original analog restricted to voice call, which mainly uses an access method with simulation technology and Frequency Division Multiple Access (FDMA in short). The second generation of mobile communication introduces a digital technology, which enhances network capacity, improves voice quality and security, and is represented by Global System for Mobile Communication (GSM in short) and Code Division Multiple Access (CDMA IS-95 in short). The third generation of mobile communication applies three technologies, i.e. CDMA2000, WCDMA and TD-SCDMA, all of which use Code Division Multiple Access as an access technology. The fourth generation of mobile communication has a relatively unified standard in the world, which is Long Term Evolution/Long Term Evolution-Advanced (LTE/LTE-A in short) constituted by 3GPP of the International Standardization Organization, wherein its downlink is based on Orthogonal Frequency Division Multiple Access (OFDMA in short), and its uplink is based on an access method of Single Carrier-Frequency Division Multiple Access (SC-FDMA in short). The fourth generation of mobile communication systems achieves a high-speed transmission with a downlink peak rate of 1 Gbps and an uplink peak rate of 500 Mbps by a flexible bandwidth and a self-adaptive modulation coding manner. FIG. 1 briefly shows a basic architecture of a mobile communication network. As shown in FIG. 1, when a user terminal is connected with an access network (e.g. a base station), the access network transmits data to a core network via a backhaul link between the access network and the core network (e.g. HLR), or the core network transmits data to the user terminal (e.g. a mobile phone) via the backhaul link.

MulteFire is a newly defined uplink transmission method based on a downlink transmission method of LTE R13 LAA. This method belongs to a LTE technology independently working at an unauthorized frequency range, i.e. stand-alone LTE-U. MulteFire applies a B-IFDMA way different from a conventional LTE uplink SC-FDMA with respect to an uplink multiplexing way, in order to meet a regional regulatory requirement on a bandwidth occupancy at an unauthorized frequency range, and introduces an MulteFire extended physical uplink control channel MF-ePUCCH in an uplink physical channel PUCCH to transmit uplink control information UCI (including ACK/NACK, CSI, SR etc.) which is transmitted via PUCCH in a conventional LTE. Because of a resource allocation characteristic of B-IFDMA, its minimum resource allocation granularity is larger. As shown in FIG. 2, there are ten interlaces in a bandwidth of 20 MHz, each interlace is numerically equal to ten uniformly-spaced PRBs in a frequency domain, and No. zero is ten black PRBs. Therefore, with respect to an uplink multiplex way applying B-IFDMA in MulteFire, by using a way of allocating an uplink control channel region (PUCCH region) at each uplink subframe in a conventional LTE, the extended physical uplink control channel region (MF-ePUCCH region) occupies at least a ratio of up to 10% of the bandwidth of the system, but meanwhile the user terminal UE does not have so much UCI necessary to be transmitted.

In order to solve the above problem of large control cost resulting from the inherent existence of MF-ePUCCH at each uplink subframe, it is necessary to use a method of dynamic indication to trigger a transmission of MF-ePUCCH of UE at appointed uplink subframe. A current triggering method includes solely indicating an MF-ePUCCH location of each UE by DL/UL grant, which is similar to resource indication of PUSCH. The advantage lies in flexible indication, but the problem mainly lies in that when a large number of users need transmissions at MF-ePUCCH, UL grant leads to a large cost of downlink signaling.

SUMMARY

Embodiments of the present disclosure provides a method and device for selecting channel, to at least solve a technical problem of a large cost for downlink signaling resulting from an uplink scheduling authorization when a large number of users transmit data in an extended physical uplink control channel.

According to a first aspect of the embodiments of the present disclosure, a method for channel selection is provided, comprising: indicating a time-domain resource position and a frequency-domain resource position of each of a plurality of extended physical uplink control channel regions based on a common physical downlink control channel; and instructing each user terminal in a group of user terminals to transmit the extended physical uplink control channel in one of the indicated plurality of extended physical uplink control channel regions, wherein different user terminals transmit extended physical uplink control channels in different ones of the indicated plurality of extended physical uplink control channel regions.

Further, indicating the time-domain resource position of each of a plurality of extended physical uplink control channel regions based on the common physical downlink control channel includes: using a N-th subframe after a subframe where the common physical downlink channel is transmitted as a subframe where the extended physical uplink control channel region is located, wherein a subframe where the common physical downlink control channel region is located is the time-domain resource position; or using a Nth uplink subframe after a subframe carried in transmission of the common physical downlink control channel as the subframe where the extended physical uplink control channel region is located, wherein the subframe where the common physical downlink control channel region is located is the time-domain resource position; or obtaining downlink control information DCI carried by the common physical downlink control channel, and indicating the time-domain resource position of the extended physical uplink control channel region according to the DCI.

Further, said N is set in any one of the following ways: being set by radio resource control RRC, being set by the downlink control information DCI, or being preset in a standard.

Further, indicating the time-domain resource position of the extended physical uplink control channel according to the DCI includes: when the user terminal detects, on the downlink subframe N, the common physical downlink control channel for indicating the extended physical uplink control channel, using a N-th subframe after a current subframe where the common physical downlink control channel is located, indicated by the DCI, as the subframe where the extended physical uplink control channel region is located.

Further, indicating the time-domain resource position of the extended physical uplink control channel according to the DCI includes: indicating the downlink subframe N with a range of 1-8 by 3-bit.

Further, indicating the frequency-domain resource position of each of a plurality of extended physical uplink control channel region based on the common physical downlink control channel includes: allocating the frequency-domain resource position for the extended physical uplink control channel according to a radio resource control RRC signaling; or indicating the frequency-domain resource position of the extended physical uplink control channel region according to the downlink control information DCI carried on the common physical downlink control channel; or determining the frequency-domain resource position of the extended physical uplink control channel region according to a control channel element CCE occupied on the common physical downlink control channel.

Further, allocating the frequency-domain resource position for the extended physical uplink control channel according to the radio resource control RRC signaling includes: indicating an interlace corresponding to the extended physical uplink control channel by a bitmap of 10-bit, or indicating any one interlace among 10 interlaces occupied by the extended physical uplink control channel by 4-bit.

Further, indicating the frequency-domain resource position of the extended physical uplink control channel region according to the downlink control information DCI carried by the common physical downlink control channel includes: indicating an interlace corresponding to the extended physical uplink control channel by a bitmap of 10-bit, or indicating any one interlace among 10 interlaces occupied by the extended physical uplink control channel by 4-bit.

Further, determining the frequency-domain resource position of the extended physical uplink control channel region according to the control channel element CCE occupied by the common physical downlink control channel includes: indicating, by a set mapping table, a mapping relationship between a position numbering J of a I-th control channel element CCE occupied by transmission of the common physical downlink control channel and a numbering K of an interlace corresponding to the extended physical uplink control channel.

Further, "indicating, by a set mapping table, a mapping relationship between a position numbering J of a I-th control channel element CCE occupied by transmission of the common physical downlink control channel and a numbering K of an interlace corresponding to the extended physical uplink control channel" includes: the radio resource control RRC, based on the first CCE position numbering occupied by the common physical downlink control channel, setting a position numbering J of the first control channel element CCE corresponding to the numbering K of the interlace.

Further, "instructing a group of user terminals to transmit the extended physical uplink control channel in the extended physical uplink control channel region which has been indicated" includes: determining a correspondent numbering of the extended physical uplink control channel in the indicated extended physical uplink control channel region according to a position of the control channel element CCE occupied by the downlink control information DCI; or setting a plurality of user terminals as a group of user terminals according to the radio resource control RRC, scrambling the common physical downlink control channel by a group RNTI, and instructing a numbering of a correspondent extended physical uplink control channel in the indicated extended physical uplink control channel region to each user terminal among the group of user terminals; or indicating a plurality of downlink subframes, and the user terminal scheduled in downlink transmission in the plurality of downlink subframes selecting a correspondent extended physical uplink control channel numbering in the indicated extended physical uplink control channel according to the position of the control channel element CCE occupied by the downlink control information DCI.

Further, "determining a correspondent numbering of the extended physical uplink control channel in the indicated extended physical uplink control channel region according to a position of the control channel element CCE occupied by the downlink control information DCI" includes: when the user terminal feedbacks the uplink control information DCI corresponding to a plurality of subframes in the indicated extended physical uplink control channel, calculating an equivalent CCE position according to a position of the control channel element CCE occupied by the transmission downlink scheduling authorization DL grant corresponding to the plurality of subframes, and indicating the numbering of the extended physical uplink control channel according to the equivalent CCE position.

Further, the equivalent CCE position is a position of the control channel element CCE corresponding to the last subframe among the plurality of subframes.

Further, "setting a plurality of user terminals as a group of user terminals according to the radio resource control RRC, scrambling the common physical downlink control channel by a group RNTI, and instructing a numbering of a correspondent extended physical uplink control channel in the indicated extended physical uplink control channel region to each user terminal among the group of user terminals" includes: the downlink control information DCI displaying and instructing the correspondent numbering of the extended physical uplink control channel in the indicated extended physical uplink control channel region to each user terminal among the group of user terminals; or according to one sole numbering in the group assigned to each user terminal among the group of user terminals, indicating the extended physical uplink control channel numbering corresponding to the user terminal in the indicated extended physical uplink control channel region.

Further, "the downlink control information DCI displaying and instructing the correspondent numbering of the extended physical uplink control channel in the indicated extended physical uplink control channel region to each user terminal among the group of user terminals" includes: combined with an original numbering of the extended physical uplink control channel, indicating a correspondent numbering of the extended physical uplink control channel to each user terminal among the group of user terminals every X bits.

Further, "indicating a correspondent numbering of the extended physical uplink control channel to each user terminal among the group of user terminals every X bit" includes: when the original numbering of the extended physical uplink control channel is N, the downlink control information DCI in the common physical downlink control channel indicates the numberings of the extended physical uplink control channels of a user terminal UE-2, a user terminal UE-5 and a user terminal UE-6, wherein the numberings of the extended physical uplink control channels of the user terminal UE-2, the user terminal UE-5 and the user terminal UE-6 are N, N+1 and N+2 respectively.

Further, "according to one sole numbering in the group assigned to each user terminal among the group of user terminals, determining the extended physical uplink control channel numbering corresponding to the user terminal in the indicated extended physical uplink control channel region" includes: accumulating the sole numbering in the group onto the original numbering of the extended physical uplink control channel, to obtain the numbering of the extended physical uplink control channel corresponding to the user terminal, wherein the original numbering is a numbering indicated in the downlink control information DCI of the common physical downlink control channel.

Further, "accumulating the sole numbering in the group onto the original numbering of the extended physical uplink control channel, to obtain the numbering of the extended physical uplink control channel corresponding to the user terminal" includes: if the original numbering of the extended physical uplink control channel is N, the numbering of the extended physical uplink control channel corresponding to the UE-n among the group of user terminals is N+n.

Further, "indicating one or more downlink subframe, and in the one or more downlink subframe, the user terminal scheduled in downlink transmission selecting a correspondent numbering of extended physical uplink control channel in the indicated extended physical uplink control channel according to the position of the control channel element CCE of the downlink scheduling authorization DL grant" includes: when the user terminal feedbacks the plurality of downlink subframes, determining the equivalent CCE position according to the position of the control channel element CCE of the downlink scheduling authorization DL grant of the plurality of downlink subframes, and determining the numbering of the extended physical uplink control channel according to the equivalent CCE position.

Further, before the user terminal feedbacks the plurality of downlink subframes, the method also includes: the downlink control information indicates any one downlink subframe of the current subframes by N-bit, and judges whether or not the user terminal is scheduled in the any one downlink subframe which is indicated. "the user terminal feedbacks the plurality of downlink subframes" includes: if it is judged that the user terminal is scheduled in the any one downlink subframe which is indicated, the user terminal feedbacks the plurality of subframes.

Further, the equivalent CCE position is a position of a first control channel element CCE.

Further, the method also includes: the common physical downlink control channel cross-carrier indicates the extended physical uplink control channel.

Further, "the common physical downlink control channel cross-carrier indicates the extended physical uplink control channel" includes: by adding a carrier indication field CIF with 3-bit or more than 3-bit in the downlink control information DCI, achieving that the common physical downlink control channel cross-carrier indicates the extended physical uplink control channel.

Further, the downlink control information DCI may be any one of the following items: downlink control information DCI for indicating the extended physical uplink control channel, and downlink control information DCI for indicating the extended physical uplink control channel and the un-extended physical uplink control channel.

Further, the common physical downlink control channel indicates the type of the uplink control information UCI feedback in the extended physical uplink control channel in any one of the following ways: indicating the type of the uplink control information UCI by different RNTI, and indicating the type of the uplink control information UCI by downlink control information.

Further, the type of the uplink control information UCI includes any one of the following types: acknowledgement character ACK/negative acknowledgement NACK feedback, multi-subframe acknowledgement character ACK/negative acknowledgement NACK feedback, multi-carrier acknowledgement character ACK/negative acknowledgement NACK feedback, multi-subframe and multi-carrier acknowledgement character ACK/negative acknowledgement NACK feedback, channel-state information CSI feedback, multi-carrier channel state information CSI feedback, reference signal SRS feedback and multi-carrier reference signal SRS feedback.

Further, "indicating the type of the uplink control information UCI by different RNTI" includes: scrambling differently-valued RNTIs assigned in a valued range of reserved RNTIs respectively to transmit the common physical downlink control channel different in type from the above uplink control information UCI.

Further, "indicating the type of the uplink control information UCI by downlink control information DCI" includes: indicating the type of the feedback downlink control information UCI by X-bit in the downlink control information DCI.

Further, "determining the type of the feedback downlink control information UCI by X-bit in the downlink control information DCI" includes: indicating ACK/NACK feedback by 3-bit, indicating mutli-subframe ACK/NACK feedback by 3-bit, indicating multi-carrier ACK/NACK feedback by 3-bit, indicating multi-subframe and multi-carrier ACK/NACK feedback by 3-bit, indicating CSI feedback by 3-bit, indicating multi-carrier CSI feedback by 3-bit, indicating SRS feedback by 3-bit, and indicating multi-carrier SRS feedback by 3-bit.

According to another aspect of the embodiments of the present disclosure, a device for selecting channel is provided, comprising: a first indicating unit, for indicating a time-domain resource position and a frequency-domain resource position of an extended physical uplink control channel region based on a common physical downlink control channel, and a second indicating unit, for instructing a group of user terminals to transmit the extended physical uplink control channel in the extended physical uplink control channel region which has been indicated, wherein different user terminals each transmit the extended physical uplink control channel in different extended physical uplink control channel regions which have been indicated.

Further, the first indicating unit includes: a first determining module, which is configured to use a Nth subframe behind a subframe of the transmitted common physical downlink control channel as a subframe where the extended physical uplink control channel region is located, wherein the frame where the common physical downlink control channel region is located is at a time-domain resource position; or a second determining moducle, which is configured to use a Nth uplink subframe behind a subframe carried in the transmitted common physical downlink control channel as a subframe where the extended physical uplink control channel region is located, wherein the subframe where the common physical downlink control channel region is located is at a time-domain resource position; or a third determining module, which is configured to obtain downlink control information DCI carried in the common physical downlink control channel, and indicate the time-domain resource position of the extended physical uplink control channel region according to DCI.

Further, the first indicating unit includes: an assigning module, which is configured to assign a frequency-domain resource position for the extended physical uplink control channel according to a radio resource control RRC signaling; or a first indicating module, which is configured to indicate the frequency-domain resource position of the extended physical uplink control channel region according to downlink control information DCI carried on the common physical downlink control channel; or a first determining module, which is configured to determine a frequency-domain resource position of the extended physical uplink control channel region according to a control channel element CCE position occupied by the common physical downlink control channel.

Further, the second indicating unit includes: a fifth determining module, which is configured to determine a numbering of a correspondent extended physical uplink control channel in the indicated extended physical uplink control channel region according to the position of the control channel element CCE occupied by the downlink control information DCI; or a second indicating module, which is configured to arrange a plurality of user terminals as a group of user terminals according to the radio resource control RRC, and indicate the numbering of the extended physical uplink control channel in the indicated extended physical uplink control channel region corresponding to each user terminal among the group of user terminals; or a sixth determining module, which is configured to indicate a plurality of downlink subframes, wherein in said plurality of downlink subframes, a scheduled downlink-transmission user terminal determines the numbering of the correspondent extended physical uplink control channel in the indicated extended physical uplink control channels according to the position of the control channel element CCE occupied by the downlink control information DCI.

The embodiments of the present disclosure also provide a non-transient computer-readable storage medium, wherein, the non-transient computer-readable storage medium stores a computer instruction, which is used to make a computer to execute the method for selecting channel of the present disclosure.

The embodiments of the present disclosure also provide a computer program product, wherein, the computer program product includes a computing program stored on a non-transient computer-readable storage medium, and the computer program includes a program instruction, which makes a computer to execute the method for selecting channel of the present disclosure when the program instruction is executed by the computer.

The embodiments of the present disclosure also provide an electronic device, comprising: at least one processor and a memory which is communicated with the at least one processor; wherein, the memory stores an instruction which can be executed by the at least one processor, and the instruction is set to execute the method for selecting channel of the present disclosure.

In the embodiments of the present disclosure, a time-domain resource position and a frequency-domain resource position of an extended physical uplink control channel region are indicated based on a common physical downlink control channel; and a group of user terminals are instructed to transmit the extended physical uplink control channel in the extended physical uplink control channel region which has been indicated, wherein different user terminals each transmit the extended physical uplink control channel in different extended physical uplink control channel regions which have been indicated. In this way, the time-domain resource position and the frequency-domain position of the extended physical uplink control channel are indicated by the common physical downlink control channel, and different user terminals are instructed to transmit the extended physical uplink control channel in different indicated extended physical uplink control channel region, to achieve the objective that different user terminals transmit data in different extended physical uplink control channels, so as to solve the technical problem of a larger downlink signaling cost resulted from the uplink scheduling authorization when a larger number of users transmit data in the extended physical uplink control channel, and thus achieve a technical effect of avoiding mutual interference when a plurality of user terminals are instructed at the same time.

BRIEF DESCRIPTION OF DRAWINGS

The drawings mentioned herein are used to make the present disclosure to be better understood, and constitute a part of the present disclosure. The exemplary embodiments of the present disclosure and the description thereof are used to illustrate the present disclosure, but do not constitute any inappropriate limitation to the present disclosure. The drawings are listed as follows.

DESCRIPTION OF EMBODIMENTS

Figure 1:
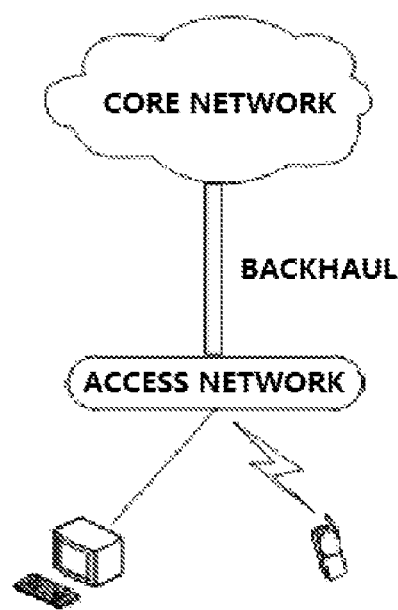
FIG. 1 is a schematic view of a basic architecture of a mobile communication network according to the related art.
Figure 2:
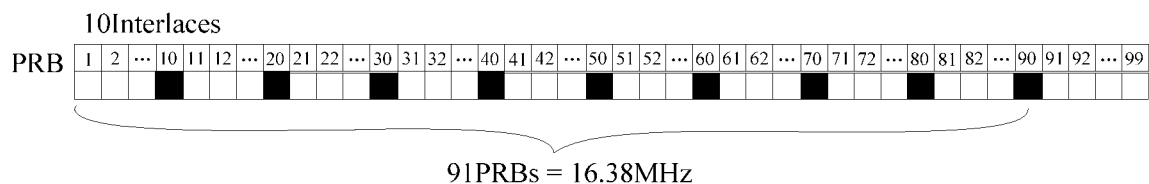
FIG. 2 is a schematic view of a resource allocation manner according to the related art.

In order to make the embodiments of the present disclosure to be understood better by the skilled in the art, the technical solutions in the embodiments of the present disclosure are clearly and completely described in the following with reference to the accompanying drawings in the embodiments of the present disclosure. Obviously, the described embodiments are merely exemplary embodiments of the present disclosure, which shall not be interpreted as limiting the present disclosure. All other embodiments obtained by those skilled in the art without creative efforts according to the embodiments of the present disclosure are within the scope of the present disclosure.

It should be clarified that, the Description, Claims and the above drawings of the present disclosure mention such terms as "first", "second", etc. which are used to distinguish similar objects, and are unnecessary to describe a certain sequence or ordering. It should be noted that, the data used herein may be interchanged in some appropriate cases, so that the embodiments of the present disclosure described herein may be embodied in the ways other than the ways described in the drawings or the description herein. In addition, the terms "comprise", "include", "have" and any modifications thereof tend to cover a nonexclusive containing. For example, a process, a method, a system, a product or a device containing a series of steps or units is unnecessary to be limited in these steps or units clearly listed, but may contain other steps or units which are not listed clearly or are inherent for the process, the method, the system, the product or the device.

Embodiment 1

According to an embodiment of the present disclosure, an embodiment of a method for selecting channel is provided. It should be clarified, steps shown in a flowchart in the drawings may be executed by a computer system containing a group of computer-executable instructions. Moreover, although a logic order is shown in the flowchart, in some cases, the shown or described steps may be executed in an order different from the order herein.

Figure 3:
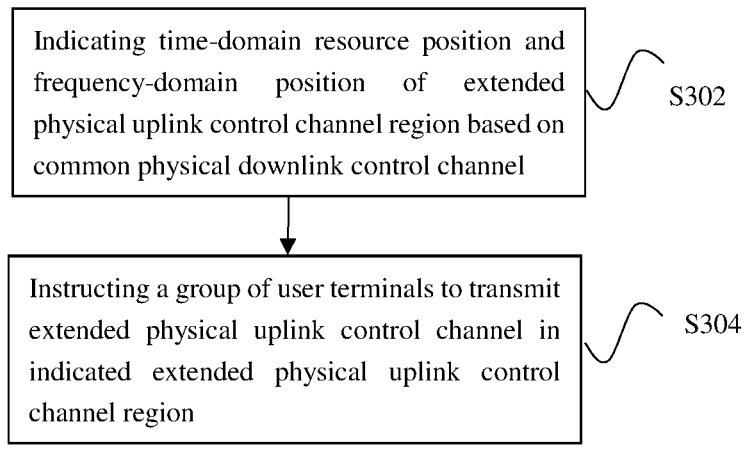
FIG. 3 is a flow chart of a method for selecting channel according to an embodiment of the present disclosure.

FIG. 3 is a flowchart of a method for selecting channel according to an embodiment of the present disclosure. As shown in FIG. 3, the method includes the following steps.

Step S302, indicating a time-domain resource position and a frequency-domain resource position of an extended physical uplink control channel region based on a common physical downlink control channel (Common PDCCH, or C-PDCCH in short).

Step S304, instructing a group of user terminals to transmit an extended physical uplink control channel in the indicated extended physical uplink control channel region, wherein different user terminals transmit the extended physical uplink control channel in different indicated extended physical uplink control channel regions.

It should be clarified that, in the embodiments of the present disclosure, the same one control signaling may be used to instruct a numbering of a correspondent extended physical uplink control channel to each user terminal of a group of user terminals at the same time. Furthermore, each user terminal may transmit the control signaling in the correspondent extended uplink control channel according to a received instruction, so as to avoid any confliction between a plurality of user terminals UE.

In the embodiments of the present disclosure, the time-domain resource position and the frequency-domain resource position of the extended physical uplink control channel is indicated by the common physical downlink control channel, and different user terminals are instructed in the different indicated extended physical uplink control channel regions to transmit extended physical uplink control channels, to achieve the purpose that different user terminals transmit data in different extended physical uplink control channels, so as to solve the problem in the related art that an uplink scheduling leads to an excessively large cost of the downlink signaling when a large number of users transmit data in the extended physical uplink control channel, and thus achieve a technical effect of avoiding any mutual interference when a plurality of user terminals are instructed at the same time.

It should be clarified that, the mobile communication described in the embodiments of the present disclosure is not limited in any particular technology, which may be WCDMA, CDMA2000, TD-SCDMA, WiMAX, LTE/LTE-A, LAA, MulteFire, and potential follow-up fifth generation, sixth generation, and even Nth generation of mobile communications.

The user terminal described in the present disclosure is a terminal-side product which can support a communication protocol of a land mobile communication system, for example, a wireless modem module of a special communication. The wireless modem module of the special communication may be integrated by several types of terminal forms (e.g. mobile phone, tablet computer, data card, etc.) so as to achieve a communication function.

For the convenience of the description, in the following embodiments of the present disclosure, the description is made by taking the fourth generation of mobile communication system (i.e. LTE/LTE-A) and its derivative Multe-Fireas examples, wherein the user terminal is referred to as UE (User Equipment), and an access device is referred to as a base station eNB or an access point (AP in short).

The time-domain resource position of the extended uplink control channel region may be indicated based on the common physical downlink control channel in several ways. In the embodiments of the present disclosure, any one of the following three ways may be adopted to indicate the time-domain resource position of the extended physical uplink control channel region.

The first way is that the Nth subframe behind a subframe sending the common physical downlink control channel is used as a subframe where the extended physical uplink control channel region is located. The subframe where the extended physical downlink control channel region is located is a time-domain resource position. N is determined in any one of the following ways: being determined by radio resource control PRC, or being preset according to a standard.

When a user terminal detects a C-PDCCH indicating MF-ePUCCH time-domain resource position at a downlink subframe M, the Nth subframe (i.e. M+N) behind the current downlink frame M is used as the subframe where the MF-ePUCCH region is located, so that the MF-ePUCCH may be sent at the subframe M+N.

The second way is that the Nth subframe behind a subframe carried in the transmitted common physical downlink control channel is used as the subframe where the extended uplink control channel region. The subframe where the common physical downlink control channel region is located is at the time-domain resource position. In the embodiments of the present disclosure, N may be determined by any one of the following ways: being determined by a radio resource control PRC, being determined by downlink control information DCI, and being preset according to a standard.

It is also possible that the subframe where the extended physical uplink control channel region (MF-ePUCCH region) is located is determined according to the Nth uplink subframe behind the subframe carried by the common physical downlink control channel C-PDCCH, so as to indicate the time-domain resource position of MF-ePUCCH by this subframe.

The third way is to obtain the downlink control information DCI carried by the common physical downlink control channel, and indicate the time-domain resource position of the extended physical uplink control channel according to DCI.

The downlink control information DCI contains information for indicating the time-domain resource position of the extended physical uplink control channel. When the user terminal UE, at the downlink subframe N, detects the common physical downlink control channel C-PDCCH for indicating the extended physical uplink control channel MF-ePUCCH, the time-domain resource position of the extended physical uplink control channel region (MF-ePUCCH region) may be determined according to the downlink control information DCI during the transmission of the C-PDCCH. For example, the Nth subframe behind the current subframe where the common physical downlink control channel indicated by the downlink control information DCI is located may be used as the subframe where the extended physical uplink control channel region (MF-ePUCCH Region) is located. The downlink subframe N with a range from 1 to 8 may be indicated by 3-Bits.

The frequency-domain resource position of the extended physical uplink channel region may be indicated based on the common physical downlink control channel in several types of ways. In the embodiments of the present disclosure, any one of the following three ways may be used to indicate the frequency-domain resource position of the extended physical uplink control channel region.

The first way is to allocate the frequency-domain resource position for the extended physical uplink control channel region according to the radio resource control PRC signaling.

An access network device (for example, a base station eNB) may send a radio resource control PRC signaling to the user terminal, and then notify, to the user terminal, a position where its correspondent MF-ePUCCH in frequency domain.

It is possible to use any method to indicate the frequency-domain resource position of the MF-ePUCCH region. For example, there are 10 interlaces under a bandwidth of 20 MHz. Therefore, it is possible to indicate an interlace corresponding to the extended physical uplink control channel MF-ePUCCH by a 10-Bite bitmap. It is also possible to indicate any one of the 10 interlaces occupied by the extended physical uplink control channel MF-ePUCCH by 4-Bite.

The second way is to indicate the frequency-domain resource position of the extended physical uplink control channel region according to the downlink control information DCI carried by the common physical downlink control channel.

Besides the above first way for indicating the frequency-domain resource position of the extended control channel MF-ePUCCH region, it is also possible to indicate the frequency-domain position of the MF-ePUCCH region in the second way. For example, there are 10 interlaces under the bandwidth of 20 MHz. Therefore, it is possible to indicate an interlace corresponding to the extended physical uplink control channel MF-ePUCCH by a 10-Bite bitmap. It is also possible to indicate any one of the 10 interlaces occupied by the extended physical uplink control channel MF-ePUCCH by 4-Bite.

The third way is to determine the frequency-domain resource position of the extended physical uplink control channel region according to a position of a control channel element CCE occupied by the common physical downlink control channel.

Besides the above first and second ways, it is also possible to indicate the frequency-domain resource position of the extended physical uplink control channel MF-ePUCCH region in the third way.

It is possible to indicate, by a specified mapping table, a mapping relationship between a position numbering J of a first control channel element CCE occupied for sending a common physical downlink control channel and a numbering K of an interlace corresponding to the extended physical uplink control channel. The mapping relationship may be configured by a radio resource control PRC, and also may be configured by a standard preset rule.

For example, based on a position numbering of the first CCE occupied by the common physical downlink control channel, the radio resource control RRC allocates a position numbering J of the first control channel element CCE corresponding to a numbering K of an interlace. That is, according to the position numbering of the first CCE occupied by C-PDCCH, RRC directly corresponds the numbering of the first CCE to the numbering of the interlace. Assuming the numbering of the first CCE of C-PDCCH is 0, then MF-ePUCCH is transmitted at the 0th interlace.

A plurality of user terminals are instructed to transmit the extended physical uplink control channel in the indicated extended physical uplink control channel region in several ways, which, in the embodiments of the present disclosure, may include any one of the following ways.

The first way is to determine a numbering of a correspondent extended physical uplink control channel in the indicated extended physical uplink control channel region according to a position of the control channel element CCE occupied by the downlink control information DCI.

The base station may transmit the downlink control information DCI to the user terminal, so as to trigger the user terminal UE to feedback the uplink control information UCI. For example, the base station may transmit a downlink authorized schedule DL grant to the user terminal UE by a downlink data channel PDCCH, so as to trigger the user terminal UE to feedback ACK/NACK corresponding to PDCCH. Then, the user terminal UE may determine an MF-ePUCCH numbering corresponding to the indicated MF-ePUCCH region according to an EEC position of a downlink control information DCI transmitted by the based station, so as to achieve the scheduling through the base station to avoid confliction between user terminals.

When the user terminal feedbacks the uplink control information UCI corresponding to a plurality of subframes in the indicated extended physical uplink control channel, an equivalent CCE position may be calculated according to the position of the control channel element CCE of the transmitted downlink control information DCI corresponding to a plurality of subframes necessary to feedback UCI, and a numbering of the extended physical uplink control channel MF-ePUCCH is indicated according to the equivalent CCE position, wherein the equivalent CCE position may be a position of a control channel element CCE corresponding to the last subframe of the plurality of subframes.

The second way is to arrange a plurality of user terminals as a group of user terminals according to a radio resource control PRC, scramble the common physical downlink control channel by a group RNTI, and instruct each user terminal of a group of user terminals with a numbering of a correspondent extended physical uplink control channel in the indicated extended physical uplink control channel region.

The base station may configure, by the RRC, a plurality of user terminals as a group of user terminals, each group is assigned with one group RNTI (which is a special common RNTI, if broadcast is needed), and each user terminal UE in this group is assigned with one sole numbering in the group. Then the common physical downlink control channel C-PDCCH is scrambled by the group RNTI. After the C-PDCCH is scrambled, it is possible to show, by the downlink control information DCI, the numbering of the extended physical uplink control channel MF-ePUCCH in the indicated extended physical uplink control channel region MF-ePUCCH region corresponding to each user terminal of the group of user terminals. In a way of DCI showing an instruction, an original numbering of the extended physical uplink control channel MF-ePUCCH may be taken into combined consideration, wherein every X Bits indicate a numbering of the extended physical uplink control channel MF-ePUCCH corresponding to one user terminal of a group of user terminals. For example, when an original numbering of the extended physical uplink control channel is N, the downlink control information DCI of the common physical downlink control channel indicates the extended physical uplink control channel numberings of a user terminal UE-2, a user terminal UE-5 and a user terminal UE-6 at the same time, wherein the extended physical uplink control channel numberings of the user terminal UE-2, the user terminal UE-5 and the user terminal UE-6 are N, N+1 and N=2 respectively.

In the embodiments of the present disclosure, it is also possible to determine the numbering of extended physical uplink control channels MF-ePUCCH corresponding to the user terminals in an indicated extended physical uplink control channel region MF-ePUCCH region according to the sole numbering in the group assigned for each user terminal of the group of user terminals. As for the way for selecting MF-ePUCCH numberings by the sole numbering in the group assigned by RRC, it is possible to obtain the numbering of the extended physical uplink control channel corresponding to the user terminal, by accumulating the sole numbering in the group to the original numbering of the extended physical uplink control channel. The original numbering is a numbering indicated in the downlink control information DCI of the common physical downlink control channel. For example, if the original numbering of the extended physical uplink control channel is N, the numbering of the extended physical uplink control channel corresponding to any user terminal UE-n of a group user terminals is N+n.

The third way is to indicate a plurality of downlink subframes, and the user terminal at downlink transmission scheduled in the plurality of downlink subframes selects the numbering of the extended physical uplink control channel corresponding to the indicated extended physical uplink control channel according to the position of the control channel element CCE occupied by the downlink control information DCI.

In the downlink control information DCI, a certain downlink subframe before a current subframe is indicated by N-bit, and it is judged whether or not the user terminal UE occupying the C-PDCCH is scheduled in any one of the indicated downlink subframes. If it is detected that the user terminal UE occupying the C-PDCCH is scheduled in the indicated downlink subframe, a feedback is operated on the indicated MF-ePUCCH. When the user terminal UE feedbacks to a plurality of downlink subframes, it is possible to firstly determine one equivalent CCE position according to the position of the control channel element CCE occupied by the downlink authorized schedule DL grant of the plurality of downlink subframes, and determine the numbering of the extended physical uplink control channel (MF-ePUCCH) according to said equivalent CCE position, wherein said equivalent CCE position may be a position of a first control channel element CCE.

The channel selecting ways provided by the present disclosure also include: the common physical downlink control channel C-PDCCH may indicate a type of the uplink control information needed to be feedback in the extended physical uplink control channel MF-ePUCCH. The type of the UCI needed to be feedback in MF-ePUCCH may be indicated by any one of the following ways: indicating the type of the uplink control information UCI by different RNTIs, or indicating the type of the uplink control information UCI by the downlink control information DCI.

The types of the above uplink control information UCIs needed to be feedback include any one of the following types: acknowledgement character ACK/negative acknowledgement NACK feedback, multi-subframe acknowledgement character ACK/negative acknowledgement NACK feedback, multi-carrier acknowledgement character ACK/negative acknowledgement NACK feedback, multi-subframe and multi-carrier acknowledgement character ACK/negative acknowledgement NACK feedback, channel-state information CSI feedback, multi-carrier channel state information CSI feedback, reference signal SRS feedback and multi-carrier reference signal SRS feedback.

Indicating the type of the uplink control information UCI by different RNTIs includes: scrambling differently-valued RNTIs assigned in a valued range of reserved RNTIs respectively to transmit the common physical downlink control channel different in type from the above uplink control information UCI.

Indicating the type of the uplink control information UCI by downlink control information DCI includes: indicating the type of the feedback downlink control information UCI by X-bit in the downlink control information DCI. Determining the type of the feedback downlink control information UCI by X-bit in the downlink control information DCI includes: indicating ACK/NACK feedback by 3-bit, indicating mutli-subframe ACK/NACK feedback by 3-bit, indicating multi-carrier ACK/NACK feedback by 3-bit, indicating multi-subframe and multi-carrier ACK/NACK feedback by 3-bit, indicating CSI feedback by 3-bit, indicating multi-carrier CSI feedback by 3-bit, indicating SRS feedback by 3-bit, and indicating multi-carrier SRS feedback by 3-bit.

The method for selecting channel provided by the present disclosure also includes: the common physical downlink control channel cross-carrier indicating the extended physical uplink control channel. The base station may transmit C-PDCCH in a carrier to indicate the MF-ePUCCH information on the carrier M. The common physical downlink control channel cross-carrier indicating the extended physical uplink control channel may be achieved in a way of adding 3-bit or more than 3-bit carrier indication field CIF in the downlink control information DCI, so as to achieve that the common physical downlink control channel cross-carrier indicates the extended physical uplink control channel.

It should be clarified that, in the above embodiments of the present disclosure, the DCI in the common physical downlink control channel C-PDCCH may be exclusively used to indicate the downlink control information of the extended physical uplink control channel; and may also transmit other indications, besides the indication for indicating the downlink control information of the extended physical uplink control channel.

The method for selecting channel provided by the present disclosure is a method for indicating of an extended physical uplink control channel MF-ePUCCH of a plurality of user terminals UE by common physical downlink control channel C-PDCCH. The method for selecting channel provided by the present disclosure can, under the condition of reducing the cost of control signaling, support flexibly indicating different user terminals UE to achieve a transmission in different MF-ePUCCHs, and avoid the confliction between the user terminals UE.

Embodiment 2

In the method for selecting channel provided by the embodiment of the present disclosure, indicating a time-domain resource position and a frequency-domain resource position of an extended physical uplink control channel (MF-ePUCCH) by the common physical downlink control channel (C-PDCCH) comprises the following steps.

Step S1 is to indicate a time-domain position of an extended physical uplink control channel region.

The step S1 includes: transmitting a Nth subframe behind a subframe of the common physical downlink control channel is a subframe where the extended physical uplink control signal region is located, wherein N is allocated by RRC or preset; or a Nth subframe behind a current subframe indicated according to a downlink control information DCI carried on the common physical downlink control channel is a subframe where the extended uplink control channel region is located.

Step S2 is to indicate a frequency-domain position of the extended physical uplink control channel region.

The step S2 includes: allocating a resource position according to a radio resource control PRC signaling; indicating a wireless resource position according to a downlink control information DCI carried by the common physical downlink control channel; and determining a frequency-domain position of the extended physical uplink control channel region according to a position of CCE transmitting the common physical downlink control channel.

Step S3 is to instruct a group of terminals in the indicated extended physical uplink control channel region to transmit an extended physical uplink control channel.

The step S3 includes: the user terminal determining a correspondent MF-ePUCCH numbering in the indicated MF-ePUCCH region according to the control channel element CCE occupied by DL grant, to avoid a confliction between UEs by the scheduling of a base station eNB; or allocating a plurality of UEs into one group by PRC, scrambling the common physical downlink control channel by a group RNTI, and displaying correspondent MF-ePUCCH numberings in the indicated MF-ePUCCH region of a plurality of UEs in this group; or by indicating a plurality of downlink subframes (DL subframes), the UE scheduled to achieve downlink transmission in this DL subframe selecting the correspondent MF-ePUCCH numbering in the indicated MF-ePUCCH region according to a CCE position occupied by the DL grant.

The embodiments of the present disclosure also include that the above CPDCCH and the indicated MF-ePUCCH may be located at different carriers, that is, the indication may be achieved in a cross-carrier manner.

The above solution may be embodied in the following way.

C-PDCCH indicating the time-domain resource position of the MF-ePUCCH in the above step S1 may be achieved in the follow manners.

One alternative manner is to use the Nth subframe behind the transmitted subframe of the common physical downlink control channel C-PDCCH as a subframe where the extended physical uplink control channel region is located, wherein N is preset according to the allocation of RRC or preset in the standard. When the UE successfully detects a C-PDCCH for indicating a MF-ePUCCH resource position on a downlink subframe M, the MF-ePUCCH is transmitted at a subframe M+N.

Another alternative manner is to use a Nth subframe behind a current subframe indicated by the downlink control information DCI carried by the common physical downlink control channel as the subframe where the extended physical uplink control channel region is located. When the UE successfully detects a C-PDCCH for indicating the MF-ePUCCH resource position on the downlink subframe M, the subframe numbering corresponding to the MF-ePUCCH is determined according to a content indicated in the DCI on the C-PDCCH. For example, N with a range of 1-8 is indicated by 3-bit.

Another alternative manner is to use the Nth uplink subframe behind the subframe carried on the transmitted common physical downlink control channel as the subframe where the extended physical uplink control channel region is located, wherein N is preset according to the allocation of RRC or preset in the standard or indicated by DCI.

In the above step S2, the C-PDCCH may indicate the frequency-domain resource position of the MF-ePUCCH region in the following ways.

On the basis of the time-domain position indication in the above step S1, further indicating frequency-domain position of the extended physical uplink control channel region includes the following manners.

One manner is that, according to a resource position allocated by the radio resource control RRC signaling, the eNB notifies a correspondent resource position in frequency domain of MF-ePUCCH to UE by the RRC signaling. For example, an interlace corresponding to MF-ePUCCH is indicated in a way of 10-bit bitmap, or a certain interlace in ten interlaces occupied by MF-ePUCCH is indicated by 4-bit.

Another manner is to indicate the wireless resource position according to the downlink control information DCI carried on the common physical downlink control channel. For example, the interlace corresponding to MF-ePUCCH is indicated in a manner of 10-bit bitmap, or a certain interlace of ten interlaces occupied by MF-ePUCCH is indicated by 4-bit.

Another manner is to determine a frequency-domain position of the extended physical uplink control channel region according to a CCE position occupied by the transmitted common physical downlink control channel. One mapping may be set to indicate a position numbering J of an $I^{th}$ CCE transmitting C-PDCCH corresponding to a correspondent position numbering K of MF-ePUCCH. This mapping relationship may be allocated or set according to a standard. For example, according to the position numbering of the first CCE of C-PDCCH, RRC allocates the CCE numbering directly corresponding to the interlace numbering. Assuming that the numbering of the first CCE of C-PDCCH is 0, MF-ePUCCH is transmitted at the zeroth interlace.

In the above step S3, C-PDCCH may indicate the MF-ePUCCH numberings of a plurality of UEs in the several ways as follows.

According to the combination of the step S1 and the step S2 in the embodiment, the time-domain resource position of the MF-ePUCCH region may be obtained. As a plurality of MF-ePUCCHs on the same time-frequency resource (e.g. 10 PRBs corresponding to 1 interlace under a bandwidth of 20 MHz) are multiplexed in a manner of code-division, it is necessary to further indicate the number of the MF-ePUCCH corresponding to each UE. Within one PRB, MF-ePUCCH may be multiplexed in time domain and frequency domain in a manner similar to that of PUCCH, that is, an orthogonal-code manner for the time domain or a cyclic-shift-sequence manner for the frequency domain. That is, within one MF-ePUCCH region, it is possible to support orthogonally transmitting N MF-ePUCCHs with numberings from 0 to N−1, and the numberings thereof correspond to an orthogonal code index used by this MF-ePUCCH in time domain or a cyclic-shift-sequence index used by this MF-ePUCCH in frequency domain.

A method for instructing a group of user terminals UE to transmit the extended physical uplink control channel within an indicated extended physical uplink control channel region includes several manners as follows.

An alternative manner is that, when UCI feedback by the UE is triggered by transmitting DCI (e.g. when UE feedbacks ACK/NACK corresponding to PDSCH, UE receives PDSCH which is triggered by eNB transmitting DL grant), UE determines a correspondent MF-ePUCCH numbering in an indicated MF-ePUCCH region according to an (E)CCE position of (E)PDCCH of DCI transmitted by eNB, and thus the confliction between UEs may be avoided by the scheduling of eNB. When UE needs to feedback UCI corresponding to a plurality of subframes at the indicated MF-ePUCCH, it is necessary to jointly calculate one equivalent CCE position according to the CCE position of DCI corresponding to a plurality of subframes needed to be feedback. For example, it is set to indicate a numbering within an MF-ePUCCH region according to a first CCE position occupied by DCI. When UE feedbacks UCIs corresponding to a plurality of subframes, the MF-ePUCCH numbering is selected according to a CCE position corresponding to a DCI of the last subframe.

Another alternative manner is that a base station eNB arranges a plurality of UEs as one group by RRC, allocates one group RNTI (which is a special common RNTI in case of broadcast), allocates one sole numbering within the group for each UE, and then scrambles the common physical downlink control channel by this group RNTI. The DCI displays MF-ePUCCH numberings in the indicated MF-ePUCCH region corresponding to a plurality of indicated UEs in this group, or selects an MF-ePUCCH numbering in the indicated MF-ePUCCH region according to its sole numbering assigned in the group. Assuming that eNB assigns UE-0, UE-2, . . . UE-7 to Group-1, each UE corresponds to a numbering in this group which is one of 0, 1, . . . 7.

As for the above manner for displaying indications by DCI, one UE in the group may be indicated by every 3-bit, which is combined with an original numbering of one MF-ePUCCH. For example, when the original numbering of MF-ePUCCH is N, in C-PDCCH, DCI indicates three UEs, which are UE-2, UE-5 and UE-6, then UE-2 corresponds to an MF-ePUCCH with a numbering of N, UE-5 corresponds to an MF-ePUCCH with a numbering of N+1, UE-6 corresponds to an MF-ePUCCH with a numbering of N+2, and so on.

As for the manner for selecting MF-ePUCCH numbering by a numbering position in the group assigned by RRC, the DCI of C-PDCCH may indicate the original numbering of the MF-ePUCCH. All of the UEs in this group each accumulate its numbering in this group based on the original MF-ePUCCH numbering. For example, if the original numbering is N, the numbering of the MF-ePUCCH corresponding to UE-n is N+n.

Another alternative manner is to indicate one or more DL subframe in the DCI of the C-PDCCH. In the DL subframe, UE which is scheduled to conduct downlink transmission selects correspondent MF-ePUCCH numbering in the indicated MF-ePUCCH region according to the CCE position of its DL grant. When one UE needs to feedback a plurality of indicated DL subframes at the same time, an equivalent CCE position is formed according to the CCE position of DL grant of the plurality of DL subframes. For example, a certain downlink subframe before a current subframe is indicated by N-bit in DCI, then the UE, which detects this C-PDCCH, judges whether or not it is necessary to conduct the feedback on the indicated MF-ePUCCH according to whether or not the indicated downlink subframe is scheduled. If this UE is scheduled in the indicated downlink subframe, the numbering of the MF-ePUCCH region is selected according to the CCE position (e.g. a position of a first CCE) of (E)PDCCH of the DL grant transmitted by the eNB.

In the above embodiments of the present disclosure, it is possible to indicate a type of the UCI needed to be feedback in MF-ePUCCH by C-PDCCH. A specific indicating manner includes: by different RNTIs or the display in DCI, indicating the type of UCI feedback, so that the user terminal may conduct the feedback according to the type of the indicated UCI.

The UCI type includes ACK/NACK feedback, multi-subframe ACK/NACK feedback, multi-carrier ACK/NACK feedback, multi-subframe and multi-carrier ACK/NACK feedback, CSI feedback, multi-carrier CSI feedback, SRS feedback, multi-carrier SRS, etc.

The specific embodying manner for differentiating UCI feedback types by RNTI is: assigning differently-valued RNTIs in the current reserved RNTI valued range to be used to scramble different UCI feedback types of C-PDCCHs respectively.

The specific embodying manner for indicating UCI feedback type by the DCI display is: matching each of the UCI types needed to be feedback by X-bit in DCI respectively. For example, 3-bit indicates any one UCI type in ACK/NACK feedback, multi-subframe ACK/NACK feedback, multi-carrier ACK/NACK feedback, multi-subframe and multi-carrier ACK/NACK feedback, CSI feedback, multi-carrier CSI feedback, SRS feedback, and multi-carrier SRS feedback.

In the embodiments of the present disclosure, C-PDCCH cross-carrier indicating MF-ePUCCH includes: based on the above step S1 to step S3, when both the base station eNB and the UE support multi-carrier transmission, eNB can transmit C-PDCCH in a carrier N to indicate the MF-ePUCCH information on a carrier M. It is possible to indicate carrier indication field (CIF in short) by adding 3 or more bits in DCI.

In the embodiments of the present disclosure, with respect to the DCI of the C-PDCCH in the above embodiments, this DCI may be a DCI which is exclusively used to indicate MF-ePUCCH, and also may be a DCI of an indication other than the indication for MF-ePUCCH.

An embodiment of the present disclosure also provides a device for selecting channel, which is mainly used to execute the method for selecting channel provided by the above contents of the embodiments of the present disclosure. Hereinafter, the device for selecting channel provided by the embodiment of the present disclosure would be introduced in detail.

Figure 4:
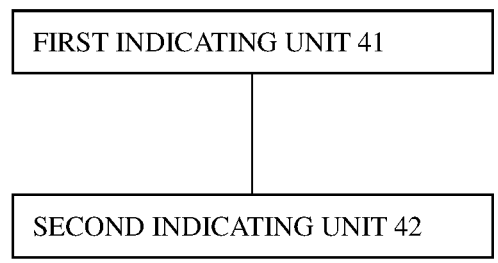
FIG. 4 is a schematic view of a device for selecting channel according to an embodiment of the present disclosure.

FIG. 4 is a schematic view of a device for selecting channel according to an embodiment of the present disclosure. As shown in FIG. 4, the device for selecting channel mainly includes a first indicating unit 41 and a second indicating unit 42. The first indicating unit 41 is used to indicate a time-domain resource position and a frequency-domain resource position of an extended physical uplink control channel region based on a common physical downlink control channel. The second indicating unit 42 is used to instruct a group of user terminals to transmit the extended physical uplink control channel within the indicated extended physical uplink control channel region. Different user terminals transmit extended physical uplink control channels within the indicated different extended physical uplink control channel regions.

In the embodiments of the present disclosure, the time-domain resource position and the frequency-domain resource position of the extended physical uplink control channel are indicated by the extended physical downlink control channel, and different user terminals are instructed to transmit extended physical uplink control channels within indicated different extended physical uplink control channel regions, to achieve a purpose that different user terminals transmit data within different extended physical uplink control channels, so as to solve a technical problem in the related art that a large downlink signaling cost due to the uplink scheduling authorization when a large number of users transmit data within an extended physical uplink control channel, and thus avoid the mutual interference when a plurality of user terminals are instructed at the same time.

Optionally, the first indicating unit includes: a first determining module, which is configured to use an Nth subframe behind a subframe of the transmitted common physical downlink control channel as a subframe where the extended physical uplink control channel region is located, wherein the frame where the common physical downlink control channel region is located is at a time-domain resource position; or a second determining module, which is configured to use an Nth uplink subframe behind a subframe carried in the transmitted common physical downlink control channel as a subframe where the extended physical uplink control channel region is located, wherein the subframe where the common physical downlink control channel region is located is at a time-domain resource position; or a third determining module, which is configured to obtain downlink control information DCI carried in the common physical downlink control channel, and indicate the time-domain resource position of the extended physical uplink control channel region according to DCI.

Optionally, N is allocated in any one of the following manners: being allocated by radio resource control RRC, being allocated by downlink control information DCI, and being preset according to a standard.

Optionally, the third determining module is configured to use the Nth subframe behind a current subframe indicated by DCI where the common physical downlink control channel is located as a subframe where the extended physical uplink control channel region is located when the user terminal detects the common physical downlink control channel for indicating the extended physical uplink control channel on the downlink subframe N.

Optionally, the third determining module is used to indicate a downlink subframe N with a range of 1-8 by 3-bit.

Optionally, the first indicating unit includes: an assigning module, which is configured to assign a frequency-domain resource position for the extended physical uplink control channel according to a radio resource control RRC signaling; or a first indicating module, which is configured to indicate the frequency-domain resource position of the extended physical uplink control channel region according to downlink control information DCI carried on the common physical downlink control channel; or a fourth determining module, which is configured to determine a frequency-domain resource position of the extended physical uplink control channel region according to a control channel element CCE position occupied by the common physical downlink control channel.

Optionally, the assigning module is used to indicate an interlace corresponding to the extended physical uplink control channel by 10-bit bitmap, or indicate any one interlace among 10 interlaces occupied by the extended physical uplink control channel by 4-bit.

Optionally, the first indicating module is used to indicate an interlace corresponding to the extended physical uplink control channel by 10-bit bitmap, or indicate any one interlace among 10 interlaces occupied by the extended uplink control channel by 4-bit.

Optionally, the fourth determining module is used to indicate a mapping relationship between a position numbering J of an Ith control channel element CCE occupied by the transmitted common physical downlink control channel and a numbering K of an interlace corresponding to the extended physical uplink control channel by a set mapping table.

Optionally, "indicate a mapping relationship between a position numbering J of an Ith control channel element CCE occupied by the transmitted common physical downlink control channel and a numbering K of an interlace corresponding to the extended physical uplink control channel by a set mapping table" includes: a radio resource control RRC arranges a position numbering of a first control channel element CCE corresponding to the numbering K of the interlace based on a numbering of a position of a first CCE occupied by the common physical downlink control channel.

Optionally, the second indicating unit includes: a fifth determining module, which is configured to determine a numbering of a correspondent extended physical uplink control channel in the indicated extended physical uplink control channel region according to the position of the control channel element CCE occupied by the downlink control information DCI; or a second indicating module, which is configured to arrange a plurality of user terminals as a group of user terminals according to the radio resource control RRC, and indicate the numbering of the extended physical uplink control channel in the indicated extended physical uplink control channel region corresponding to each user terminal among the group of user terminals; or a sixth determining module, which is configured to indicate a plurality of downlink subframes, wherein in said plurality of downlink subframes, a scheduled downlink-transmission user terminal determines the numbering of the correspondent extended physical uplink control channel in the indicated extended physical uplink control channels according to the position of the control channel element CCE occupied by the downlink control information DCI.

Optionally, the fifth determining module is configured to: when the user terminal feedbacks uplink control information UCI corresponding to a plurality of subframes in the indicated extended physical uplink control channel, authorize the position of the control channel element CCE occupied by DL grant to calculate an equivalent CCE position according to a downlink scheduling corresponding to the plurality of subframes, and indicate the numbering of the extended physical uplink control channel according to the equivalent CCE position. Optionally, the equivalent CCE position is a position of a control channel element CCE corresponding to the last subframe among the plurality of subframes.

Optionally, the second indicating module is configured that: the downlink control information DCI indicates a numbering of a correspondent extended physical uplink control channel in the indicated extended physical uplink control channel region corresponding to each user terminal among a group of user terminals; or determines the numbering of the extended physical uplink control channel corresponding to the user terminal in the indicated extended physical uplink control channel region according to the sole numbering in the group assigned to each user terminal among a group of user terminals.

Optionally, "the downlink control information DCI indicates a numbering of a correspondent extended physical uplink control channel in the indicated extended physical uplink control channel region corresponding to each user terminal among a group of user terminals" includes: in combination with an original numbering of the extended physical uplink control channel, the numbering of the extended physical uplink control channel corresponding to one user terminal among the group of user terminals is indicated every X bits.

Optionally, "the numbering of the extended physical uplink control channel corresponding to one user terminal among the group of user terminals is indicated every X bits" includes: when the original numbering of the extended physical uplink control channel is N, the downlink control information DCI of the common physical downlink control channel indicates the numberings of the extended physical uplink control channels of the user terminal UE-2, the user terminal UE-5 and the user terminal UE-6, wherein the numberings of the extended physical uplink control channels of the user terminal UE-2, the user terminal UE-5 and the user terminal UE-6 are N, N+1 and N+2 respectively.

Optionally, "determining the numbering of the extended physical uplink control channel corresponding to the user terminal in the indicated extended physical uplink control channel region according to the sole numbering in the group assigned to each user terminal among a group of user terminals" includes: accumulating the sole numbering in the group to the original numbering of the extended physical uplink control channel to obtain the numbering of the extended physical uplink control channel corresponding to the user terminal, wherein the original numbering is a numbering indicated in the downlink control information DCI of the common physical downlink control channel.

Optionally, "accumulating the sole numbering in the group to the original numbering of the extended physical uplink control channel to obtain the numbering of the extended physical uplink control channel corresponding to the user terminal" includes: if the original numbering of the extended physical uplink control channel is N, the numbering of the extended physical uplink control channel corresponding to the user terminal UE-n among the group of user terminals is N+n.

Optionally, the sixth determining module is configured to: when the user terminal feedbacks a plurality of downlink suframes, determine an equivalent CCE position according to the position of the control channel element CCE of the downlink scheduling authorization DL grant of the plurality of downlink subfarmes, and determine the numbering of the extended physical uplink control channel according to the equivalent CCE position.

Optionally, before the user terminal feedbacks a plurality of downlink subframes, the device also includes: the downlink control information indicates any one downlink subframe among the current subframes by N-bit, and judges whether or not the user terminal is scheduled in any one indicated downlink subframe. "the user terminal feedbacks a plurality of downlink subframes" includes: if it is judged that the user terminal is scheduled in any one indicated downlink subframe, the user terminal feedbacks to a plurality of downlink subframes.

Optionally, the equivalent CCE position is a position of the first control channel element.

Optionally, the device also includes a third indicating unit, which is configured to cross-carrier indicate the extended physical uplink control channel by the common physical downlink control channel.

Optionally, the third indicating unit includes: achieving that the common physical downlink control channel cross-carrier indicates the extended physical uplink control channel by adding a carrier indication field of 3 bit or more than 3 bit in the downlink control information DCI.

Optionally, the downlink control information DCI may be any one of the following items: downlink control information DCI for indicating an extended physical uplink control channel, or downlink control information DCI for indicating an extended physical uplink control channel and an un-extended physical uplink control channel.

An embodiment also provides a non-transient computer readable storage medium, which stores computer instructions for a computer to execute the method provided by any one of the method embodiments as above.

An embodiment also provides a computer program product, which includes a computer program stored on the non-transient computer readable storage medium. The computer program includes program instructions, wherein when the program instructions are executed by a computer, the computer can execute the method provided by any one of the method embodiments as above.

Figure 5:
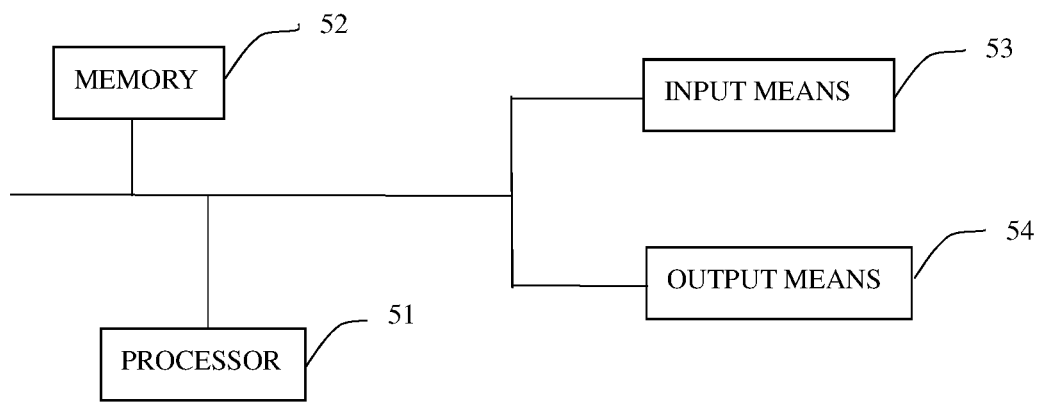
FIG. 5 is a hardware structural view of an electronic device for executing the selection of channel according to an embodiment of the present disclosure.

FIG. 5 is a hardware structural schematic view of an electronic device for executing the method for selecting channel provided by the present disclosure. As shown in FIG. 5, the electronic device includes: one or more processor 51 and a memory 52, wherein FIG. 5 takes one processor 51 as an example.

The electronic device may also include an input means 53 and an output means 54.

The processor 51, the memory 52, the input means 53 and the output means 54 may be connected by a bus or in other ways. FIG. 5 takes a bus-connection as an example.

The memory 52, as a non-transient computer readable storage medium, may be used to store a non-transient software program, and a non-transient computer-executable program or module such as a program instruction/module corresponding to the method for selecting channel in the embodiments of the present disclosure (e.g. the first indicating unit 41 and the second indicating unit 42 as shown in FIG. 4). The processor 51 runs the non-transient software program, instructions and module stored in the memory 52, to execute all kinds of function applications and data processing of a server, i.e. achieve the method for selecting channel in the above method embodiments.

The memory 52 may include a program-storing area and a data-storing area, wherein the program-storing area may store an operation system and at least one function-needed application program; and the data-storing area may store the data created according to the usage of the device for selecting channel, etc.

In addition, the memory 52 may include a high-speed random access memory, and also may include a non-transient memory, e.g. at least one disk storage device, a flash memory device, or other non-transient solid storage device. In some embodiments, the memory 52 optionally includes memories which are remote from the memory 51. These remote memories may be connected to the device for selecting channel via network connections. The examples of the above network include but are not limited in an internet, an intranet, a local area network, a mobile communication network and the combinations thereof. The input means 53 may receive input digital or character information, and generate a key signal input associated with a user setting and function control of the device for selecting channel. The output means 54 may include a display device, e.g. a display screen, etc.

Said one or more module is stored in the memory 52. When said one or more module is executed by one or more processor 51, the methods for selecting channel in any one of the method embodiments as above are executed.

The above products may execute the methods provided by the embodiments of the present disclosure, and can achieve function modules and beneficial effects corresponding to the execution methods. As to technical details which are not described in detail in the embodiments, please refer to the methods provided by the embodiments of the present disclosure.

The electronic device of the embodiments of the present disclosure may exist in a plurality of forms, which include but are not limited in: (1) a mobile communication device, which is characterized in a mobile communication function, and has an objective for providing voice/data communication, wherein this type of terminal includes a smartphone (e.g. iPhone), a multi-media cellphone, a functional cellphone, a low-end cellphone, etc.; (2) a ultra-mobile personal computer device, which belongs to a category of a personal computer with a computing and processing function and may have a mobile network-connection characteristic, and this type of device includes PDA, MID and UMPC device, etc., e.g. iPad; (3) a portable entertainment device, which may display and play multi-media contents, wherein this type of device includes a video/audio player (e.g. iPod), a handheld game console, an e-book, a smart toy and a portable car navigation device; (4) a server, which provides a computing service and has a structure including a processor, a hard-disk, an internal memory, a system bus, etc., wherein the architecture of the server is similar to the architecture of a general computer, but since a reliable service shall be provided, the server has a high requirement with respect to processing ability, stability, reliance, security, extendibility, manageability, etc.; and (5) other electronic device with a data-interchange function.

The numberings of the above embodiments of the present disclosure are provided only for the convenient description, which do not represent whether or not respective embodiments are more preferred or less preferred.

In the above embodiments of the present disclosure, the embodiments are described with different emphasis. As for the details which are not mentioned in some embodiments, please refer to the relevant description in other embodiments.

In several embodiments provide by the present disclosure, it should be understood that, the published technical contents may by achieved in other ways. The above-mentioned device embodiments are only exemplary. For example, the division for units may be a division with respect to a logic function, and actually when the division is conducted, other division ways may be adopted, for example, a plurality of units or components may be combined or may be integrated with other systems, or some features may be omitted or are not executed. In addition, the mutual coupling between showed or described components or a direct coupling or communication connection may be achieved via some ports. An indirect coupling or communication connection between units or modules may be adopted in electric or other ways.

The units which are described as separated components may be or may not be separated physically. The components shown as units may be or may not be physical units, that is, may be located at one place, or may be distributed on a plurality of units. The objective of the technical solution of the present disclosure may be achieved according to actual requirement by selecting parts or all of the units.

In addition, the functional units in the embodiments of the present disclosure may be integrated within one processing unit, also may exist physically as individual units, and also may provide two or more units which are integrated within one unit. The above integrated units may be achieved in a hardware form, or may be achieved in a software-functional-unit form.

When the integrated units are achieved in a software-functional-unit form and sold or used as individual products, the integrated units may be stored within one computer-readable storage medium. Based on such an understanding, the technical solutions of the present disclosure may be conducted as parts making contribution to the related art in nature, or all or parts of the technical solutions may embodied in a software form. The computer software product may be stored in a storage medium, including several instructions for making one computer device (e.g. a personal computer, a server or a network device, etc.) to execute all or parts of steps of the methods of the embodiments of the present disclosure. The above storage medium includes: all kinds of mediums for storing program coding, e.g. a U-disk, a Read-Only Memory (ROM), a Random Access Memory (RAM), a portable hard disk, a diskette, an optical disk, etc.

Hereinbefore, the present disclosure just describes preferable embodiments. In should be noted that, for the skilled in the related art, it is still possible to modify or improve the technical solutions described in the above embodiments, but these modifications or improvements also shall be considered to fall into the protection scope of the present disclosure under the circumstance that it does not depart from the scope of the present disclosure.

What is claimed is:

1. A method for channel selection, comprising steps of:
indicating a time-domain resource position and a frequency-domain resource position of each of a plurality of extended physical uplink control channel regions based on a common physical downlink control channel; and
instructing each user terminal in a group of user terminals to transmit an extended physical uplink control channel in one of the indicated plurality of extended physical uplink control channel regions, wherein different user terminals transmit extended physical uplink control channels in different ones of the indicated plurality of extended physical uplink control channel regions,
wherein the step of indicating the frequency-domain resource position of each of a plurality of extended physical uplink control channel regions based on the common physical downlink control channel comprises:

allocating a frequency-domain resource position for the extended physical uplink control channel according to radio resource control (RRC) signaling; or indicating the frequency-domain resource position of the extended physical uplink control channel region according to downlink control information (DCI) carried on the common physical downlink control channel, wherein, allocating the frequency-domain resource position for the extended physical uplink control channel according to the RRC signaling comprises:

indicating an interlace corresponding to the extended physical uplink control channel by a bitmap of 10-bit, or indicating any one interlace among 10 interlaces occupied by the extended physical uplink control channel by 4-bit, and wherein, indicating the frequency-domain resource position of the extended physical uplink control channel region according to the DCI carried on the common physical downlink control channel comprises:

indicating an interlace corresponding to the extended physical uplink control channel by a bitmap of 10-bit, or indicating any one interlace among 10 interlaces occupied by the extended physical uplink control channel by 4-bit.

2. The method according to claim 1, wherein the step of indicating the time-domain resource position of each of a plurality of extended physical uplink control channel regions based on the common physical downlink control channel comprises:

using an $N^{th}$ subframe after a subframe where the common physical downlink channel is transmitted as a subframe where the extended physical uplink control channel region is located, wherein a subframe where the common physical downlink control channel region is located is the time-domain resource position; or using an $N^{th}$ uplink subframe after a subframe carried in transmission of the common physical downlink control channel as the subframe where the extended physical uplink control channel region is located, wherein the subframe where the common physical downlink control channel region is located is the time-domain resource position; or obtaining DCI carried by the common physical downlink control channel, and indicating the time-domain resource position of the extended physical uplink control channel region according to the DCI.

3. The method according to claim 2, wherein said N is set in any one of the following ways: being set by RRC, being set by the DCI, or being preset in a standard.

4. The method according to claim 2, wherein indicating the time-domain resource position of the extended physical uplink control channel according to the DCI comprises:

when a user terminal detects, on the downlink subframe N, the common physical downlink control channel for indicating the extended physical uplink control channel, using an $N^{th}$ subframe after a subframe where the common physical downlink control channel is currently located, indicated by the DCI, as the subframe where the extended physical uplink control channel region is located.

5. The method according claim 4, wherein indicating the time-domain resource position of the extended physical uplink control channel according to the DCI includes: indicating the downlink subframe N with a range of 1-8 by 3 bits.

6. A non-transitory computer-readable storage medium, wherein the non-transitory computer-readable storage medium stores computer instructions which are used to cause a computer to perform the method according to claim 1.

7. A computer program product, comprising a non-transitory computer-readable storage medium storing a computing program, the computing program comprising program instructions that when executed by a computer, cause the computer to perform the method according to claim 1.

8. An electronic device, comprising: at least one processor and a memory communicatively connected to the at least one processor;

wherein, the memory stores instructions, and the at least one processor executes the instructions to perform the method according to claim 1.

9. A device for channel selection, comprising: at least one processor and a memory communicatively connected to the at least one processor, wherein the memory stores instructions, and the at least one processor executes the instructions to:

indicate a time-domain resource position and a frequency-domain resource position of each of a plurality of extended physical uplink control channel regions based on a common physical downlink control channel, and instruct each user terminal in a group of user terminals to transmit an extended physical uplink control channel in one of the indicated plurality of extended physical uplink control channel regions, wherein different user terminals transmit extended physical uplink control channels in different ones of the indicated plurality of extended physical uplink control channel regions, wherein said indicating the frequency-domain resource position of each of a plurality of extended physical uplink control channel regions based on the common physical downlink control channel comprises:

allocating a frequency-domain resource position for the extended physical uplink control channel according to radio resource control (RRC) signaling; or indicating the frequency-domain resource position of the extended physical uplink control channel region according to downlink control information (DCI) carried on the common physical downlink control channel, wherein, allocating the frequency-domain resource position for the extended physical uplink control channel according to the radio resource control RRC signaling comprises:

indicating an interlace corresponding to the extended physical uplink control channel by a bitmap of 10-bit, or indicating any one interlace among 10 interlaces occupied by the extended physical uplink control channel by 4-bit, and wherein, indicating the frequency-domain resource position of the extended physical uplink control channel region according to the DCI carried on the common physical downlink control channel comprises:

indicating an interlace corresponding to the extended physical uplink control channel by a bitmap of 10-bit, or indicating any one interlace among 10 interlaces occupied by the extended physical uplink control channel by 4-bit.

* * * * *